(12) United States Patent
Lee et al.

(10) Patent No.: US 10,999,021 B2
(45) Date of Patent: May 4, 2021

(54) METHOD FOR SUPPORTING MULTIPLE TRANSMISSION TIME INTERVALS, MULTIPLE SUBCARRIER INTERVALS, OR MULTIPLE PROCESSING TIME INTERVALS IN WIRELESS COMMUNICATION SYSTEM, AND APPARATUS THEREFOR

(71) Applicant: LG ELECTRONICS INC., Seoul (KR)

(72) Inventors: Hyunho Lee, Seoul (KR); Yunjung Yi, Seoul (KR); Daesung Hwang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/483,368

(22) PCT Filed: Feb. 1, 2018

(86) PCT No.: PCT/KR2018/001401
§ 371 (c)(1),
(2) Date: Aug. 2, 2019

(87) PCT Pub. No.: WO2018/143701
PCT Pub. Date: Aug. 9, 2018

(65) Prior Publication Data
US 2020/0028635 A1 Jan. 23, 2020

Related U.S. Application Data

(60) Provisional application No. 62/454,013, filed on Feb. 2, 2017, provisional application No. 62/454,869, filed
(Continued)

(51) Int. Cl.
*H04L 1/18* (2006.01)
*H04L 5/00* (2006.01)
*H04W 80/08* (2009.01)

(52) U.S. Cl.
CPC .......... *H04L 1/1896* (2013.01); *H04L 1/1819* (2013.01); *H04L 1/1835* (2013.01);
(Continued)

(58) Field of Classification Search
CPC ... H04L 5/0055; H04L 5/0053; H04L 1/1812; H04W 72/042; H04W 72/0413
See application file for complete search history.

(56) References Cited

U.S. PATENT DOCUMENTS

2008/0109694 A1 * 5/2008 Jen .................. H04L 1/1854
714/748
2013/0195065 A1 * 8/2013 Park .................. H04L 5/0055
370/329
(Continued)

FOREIGN PATENT DOCUMENTS

JP 2013511937 4/2013

OTHER PUBLICATIONS

European Patent Office Application Serial No. 18748189.0, Search Report dated Jan. 17, 2020, 35 pages.
(Continued)

*Primary Examiner* — Jung H Park
(74) *Attorney, Agent, or Firm* — Lee, Hong, Degerman, Kang & Waimey

(57) ABSTRACT

A method for transmitting uplink control information for a terminal supporting multiple transmission time interval (TTI) lengths, multiple subcarrier intervals, or multiple processing time intervals in a wireless communication system according to one embodiment of the present disclosure is performed by the terminal, and may comprise the steps of: receiving a configuration for repeated transmission of HARQ-acknowledgement (ACK)/non-acknowledgement information for a downlink transmission block; and when the repeated transmission is triggered according to the
(Continued)

configuration therefor, transmitting the HARQ-ACK information to a base station, wherein the repeated transmission is triggered when a predetermined condition is satisfied.

19 Claims, 11 Drawing Sheets

Related U.S. Application Data on Feb. 5, 2017, provisional application No. 62/471,885, filed on Mar. 15, 2017, provisional application No. 62/476,604, filed on Mar. 24, 2017.

(52) U.S. Cl.
CPC .......... *H04L 5/0055* (2013.01); *H04L 5/0082* (2013.01); *H04L 5/0094* (2013.01); *H04W 80/08* (2013.01)

(56) References Cited

U.S. PATENT DOCUMENTS

| | | | |
|---|---|---|---|
| 2013/0235768 A1 | 9/2013 | Earnshaw et al. | |
| 2016/0183244 A1* | 6/2016 | Papasakellariou | H04L 5/001 370/329 |
| 2016/0227540 A1* | 8/2016 | Chen | H04L 5/0064 |
| 2018/0124798 A1* | 5/2018 | Ramamurthi | H04L 5/0055 |
| 2019/0349923 A1* | 11/2019 | Shao | H04W 72/0413 |

OTHER PUBLICATIONS

NTT Docomo, "Processing time and HARQ process number for NR", 3GPP TSG RAN WG1 AH NR Meeting, R1-1700624, XP051208149, Jan. 2017, 7 pages.

PCT International Application No. PCT/KR2018/001401, Written Opinion of the International Searching Authority dated May 30, 2018, 26 pages.

Huawei, et al., "Discussion on sPUCCH design", 3GPP TSG RAN WG1 Meeting #87, R1-1611160, Nov. 2016, 6 pages.

Huawei, et al., "Handling collision between PUCCH and sPUCCH", 3GPP TSG RAN WG1 Meeting #87, R1-1611164 Nov. 2016, 4 pages.

LG Electronics, "Channel selection sPUCCH for HARQ-ACK in shortened TTI length", 3GPP TSG RAN WG1 Meeting #87, R1-1611774, Nov. 2016, 7 pages.

Ericsson, "HARQ-ACK bundling for FeMTC", 3GPP TSG RAN WG1 Meeting #87, R1-1611099, Nov. 2016, 7 pages.

European Patent Office Application Serial No. 18748189.0, Search Report dated Apr. 21, 2020, 24 pages.

Samsung, "HARQ-ACK Coverage Enhancements", 3GPP TSG RAN WG1 Meeting #82bis, R1-155448, XP051002353, Oct. 2015, 3 pages.

Huawei, et al., "Discussion on sPUCCH design", 3GPP TSG RAN WG1 Meeting #86bis, R1-1608637, XP051148696 Oct. 2016, 5 pages.

Ericsson, "Handling overlapping allocations with short and 1 ms TTI", 3GPP TSG RAN WG1 Meeting #87, R1-1611514, XP051175491, Nov. 2016, 3 pages.

LG Electronics, "Discussion on collisions between TTI and sTTI", 3GPP TSG RAN WG1 Meeting #87, R1-1611772, XP051175741, Nov. 2016, 4 pages.

Sharp, "HARQ-ACK feedback collision handling for 1ms TTI with shortened processing time," 3GPP TSG-RAN WG1 #88, R1-1703233, Feb. 2017, 3 pages.

Samsung, "HARQ processes handling to support dynamic switching between 1ms TTI and sTTI," 3GPP TSG-RAN WG1 #88, R1-1702884, Feb. 2017, 2 pages.

NTT Docomo, Inc., "Collision handling between sTTI and TTI for UL," 3GPP TSG-RAN WG1 #88, R1-1702780, Feb. 2017, 3 pages.

Samsung, "Processing time and number for HARQ processes," 3GPP TSG-RAN WG1 #88, R1-1702991, Feb. 2017, 4 pages.

Japan Patent Office Application Serial No. 2019-542083, Office Action dated Aug. 25, 2020, 5 pages.

InterDigital Communications, "A common framework for control channel design for NR", R1-1612645, 3GPP TSG RAN G1 Meeting #87, Nov. 2016, 6 pages.

* cited by examiner

FIG. 7
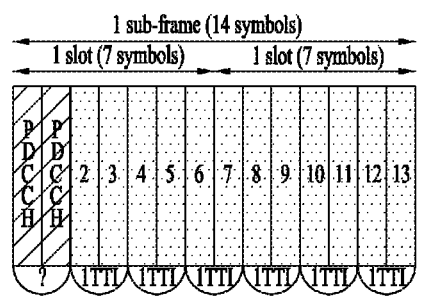
(a) 2 symbol TTI DL structure
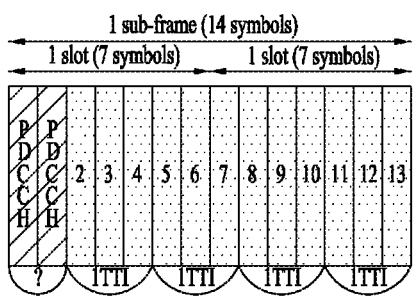
(b) 3 symbol TTI DL structure
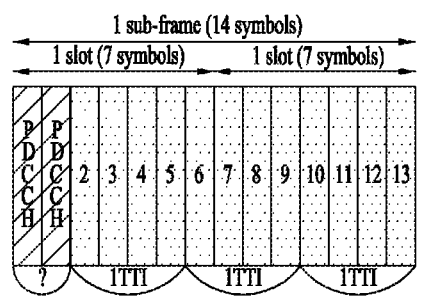
(c) 4 symbol TTI DL structure
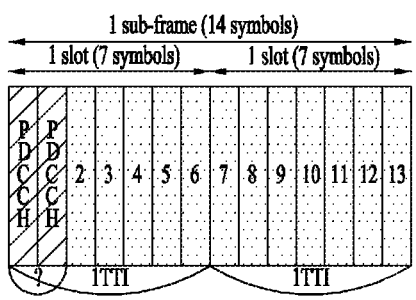
(d) 7 symbol TTI DL structure

METHOD FOR SUPPORTING MULTIPLE TRANSMISSION TIME INTERVALS, MULTIPLE SUBCARRIER INTERVALS, OR MULTIPLE PROCESSING TIME INTERVALS IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2018/001401, filed on Feb. 1, 2018, which claims the benefit of U.S. Provisional Application Nos. 62/454,013, filed on Feb. 2, 2017, 62/454,869, filed on Feb. 5, 2017, 62/471,885, filed on Mar. 15, 2017, and 62/476,604, filed on Mar. 24, 2017, the contents of which are hereby incorporated by reference herein in their entirety.

TECHNICAL FIELD

The present disclosure relates to a wireless communication system, and more particularly, to a method for supporting multiple transmission time intervals, multiple subcarrier spacings, or multiple processing times and apparatus therefor.

BACKGROUND ART

The latency of packet data is one of important performance metrics. To reduce the latency of packet data and provide faster Internet access to an ender user is one of challenging issues in designing the next-generation mobile communication system called new radio access technology (RAT) as well as long term evolution (LTE).

The present disclosure provides a description related to a reference signal in a wireless communication system supporting a reduction in latency.

DISCLOSURE

Technical Problem

The object of the present disclosure is to provide an uplink transmission operation performed by a UE that supports a plurality of transmission time intervals, a plurality of subcarrier spacings, or a plurality of processing times.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of transmitting uplink control information by a user equipment (UE) supporting a plurality of transmission time intervals (TTIs), a plurality of subcarrier spacings, or a plurality of processing times in a wireless communication system. The method may include: receiving a configuration of repeated transmission of acknowledgement/non-acknowledgement (HARQ-ACK) information for a downlink transport block; and when the repeated transmission is triggered, transmitting the HARQ-ACK information to a base station according to the configuration of the repeated transmission. The repeated transmission may be triggered when a predetermined condition is satisfied.

Additionally or alternatively, when the UE is configured with a specific TTI length or a specific processing time, the size of a soft buffer for the downlink transport block may be determined by a parameter for the specific TTI length or the specific processing time.

Additionally or alternatively, the parameter may be different from a parameter for a reference TTI length or a reference specific processing time.

Additionally or alternatively, when the UE is configured with the specific TTI length or the specific processing time, the size of the soft buffer for the downlink transport block may be configured differently depending on the service type or priority of the downlink transport block.

Additionally or alternatively, when the UE is configured with the specific TTI length or the specific processing time, the number of identifiable hybrid automatic retransmission request (HARQ) processes may be configured differently depending on the service type or priority of the downlink transport block.

Additionally or alternatively, the repeated transmission may be triggered when the payload size or coding rate of the HARQ-ACK information is equal to or greater than a threshold.

Additionally or alternatively, the number of times of the repeated transmission may be determined according to the payload size or the coding rate.

Additionally or alternatively, the repeated transmission may be triggered when the UE is configured with a plurality of serving cells.

Additionally or alternatively, the repeated transmission may be triggered by a specific field in downlink control information related to the downlink transport block.

Additionally or alternatively, the repeated transmission may be trigged when the transmission timing of an uplink channel for transmitting the HARQ-ACK information overlaps with the transmission timing of a different uplink channel Additionally or alternatively, transmission of the different uplink channel may be dropped or stopped.

Additionally or alternatively, uplink control information to be transmitted on the different uplink channel may be transmitted together on the uplink channel for transmitting the HARQ-ACK information.

Additionally or alternatively, the repeated transmission may be triggered when the transmission timing of the uplink channel for transmitting the HARQ-ACK information overlaps with the transmission timing of a different uplink channel and when the payload size of the HARQ-ACK information and the payload size or coding rate of uplink control information to be transmitted on the different uplink channel are equal to or greater than a threshold.

Additionally or alternatively, when the repeated transmission is triggered, uplink resources for transmitting the HARQ-ACK information every a specific number of TTIs may be determined by frequency hopping.

Additionally or alternatively, a frequency hopping pattern may be determined according to the number of times of the repeated transmission.

Additionally or alternatively, when the repeated transmission is triggered, a demodulation reference signal may be transmitted in a TTI or a symbol indicated by a higher layer signal or a physical layer signal.

Additionally or alternatively, when the repeated transmission is triggered, sharing of a demodulation reference signal in TTIs where the repeated transmission is performed may be enabled by a higher layer signal or a physical layer signal.

Additionally or alternatively, when the repeated transmission is triggered and when the transmission timing of the uplink channel for transmitting the HARQ-ACK information partially or completely overlaps with the transmitting timing of a different uplink channel, HARQ-ACK information to be transmitted in a TTI(s) overlapping with the transmitting timing of the different uplink channel among TTIs where the repeated transmission is performed may be dropped.

Additionally or alternatively, when the repeated transmission is triggered and when the transmission timing of the uplink channel for transmitting the HARQ-ACK information partially or completely overlaps with the transmitting time of a different uplink channel, the uplink channel for transmitting the HARQ-ACK information and the different uplink channel may be simultaneously transmitted.

In another aspect of the present disclosure, provided herein is a user equipment (UE) for supporting a plurality of transmission time intervals (TTIs), a plurality of subcarrier spacings, or a plurality of processing times in a wireless communication system. The UE may include a receiver, a transmitter, and a processor configured to control the receiver and the transmitter. The processor may be configured to receive a configuration of repeated transmission of acknowledgement/non-acknowledgement (HARQ-ACK) information for a downlink transport block and transmit the HARQ-ACK information to a base station according to the configuration of the repeated transmission when the repeated transmission is triggered. The repeated transmission may be triggered when a predetermined condition is satisfied.

The above-described aspects of the present disclosure are merely parts of the embodiments of the present disclosure. It will be understood by those skilled in the art that various embodiments are derived from the following detailed description of the present disclosure without departing from the technical features of the disclosure.

Advantageous Effects

According to the present disclosure, the pattern of a downlink demodulation reference signal used for sPDCCH/sPDSCH demodulation can be newly defined based on a sTTI structure. In addition, the pattern may not collide with a conventional CRS and CSI-RS.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure.

FIG. 7 illustrates the structures of DL subframes including short TTIs of multiple lengths (various numbers of symbols).

MODE FOR CARRYING OUT THE INVENTION

Figure 1:
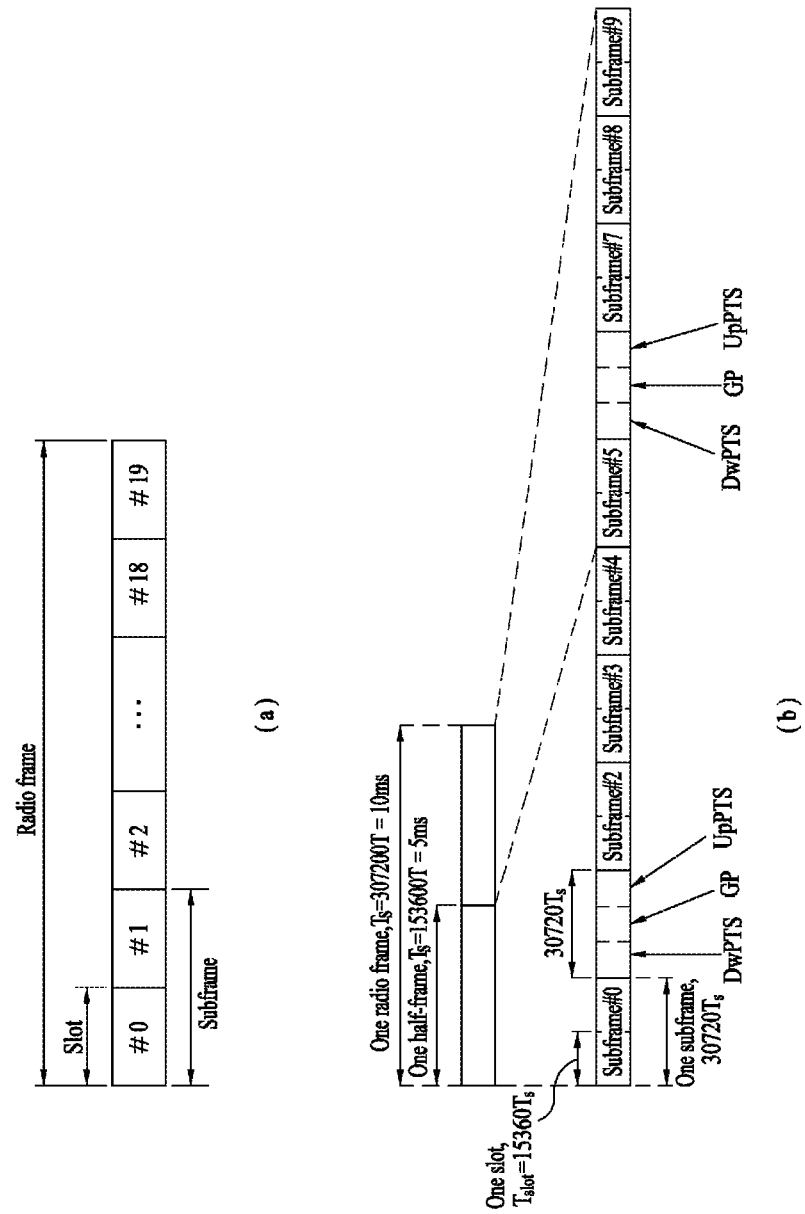
FIG. 1 is a diagram for an example of a radio frame structure used in wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot Time Slot), GP (Guard Period), and UpPTS (Uplink Pilot Time Slot). DwPTS is a period reserved for downlink transmission and UpPTS is a period reserved for uplink transmission. Table 2 shows special subframe configuration.

Figure 2:
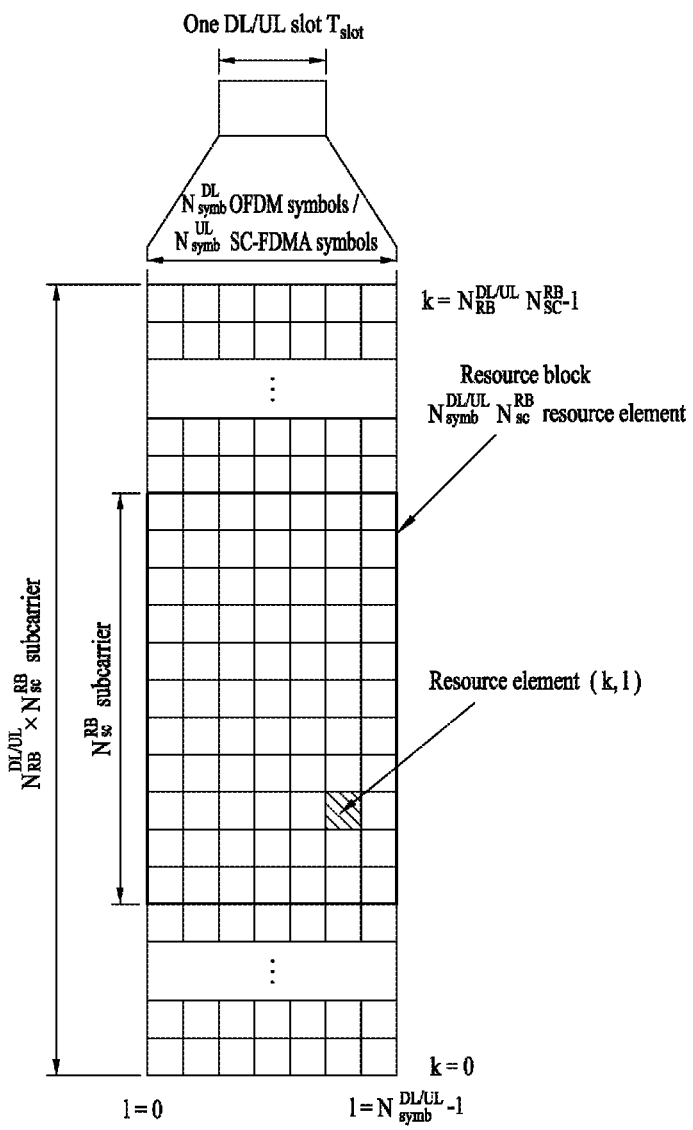
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of symb $N_{symb}^{DL/UL} * N_{sc}^{RB}$ REs. Each RE in a resource grid can be uniquely defined by an index pair (k, l) in a slot. Here, k is an index in the range

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | of 0 to $N_{symb}^{DLIUL} * N_{sc}^{RB}-1$ in the frequency domain and 1 is an index in the range of $N_{symb}^{DLIUL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
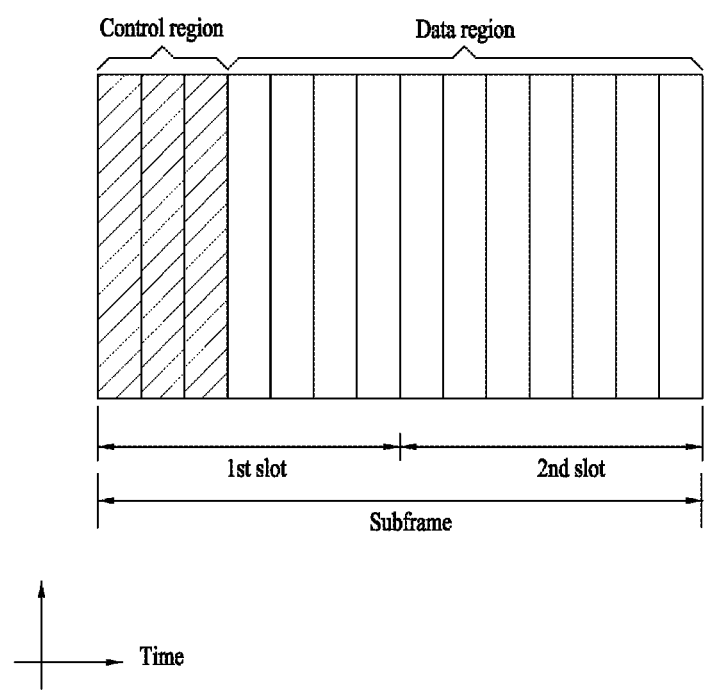
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate in a search space, and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
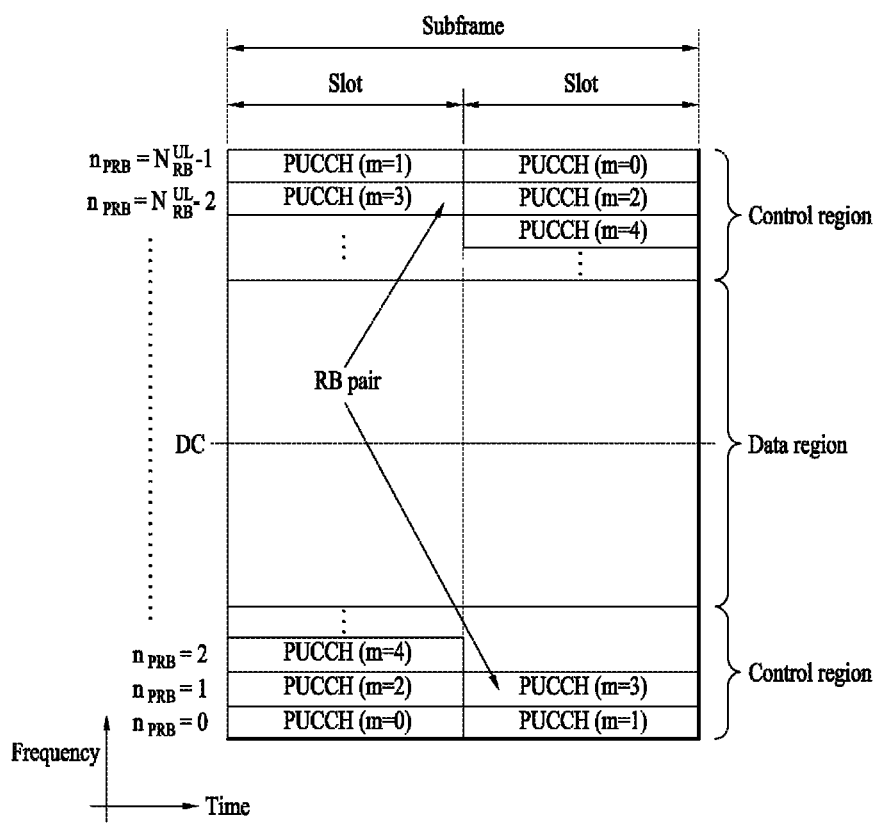
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:, i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
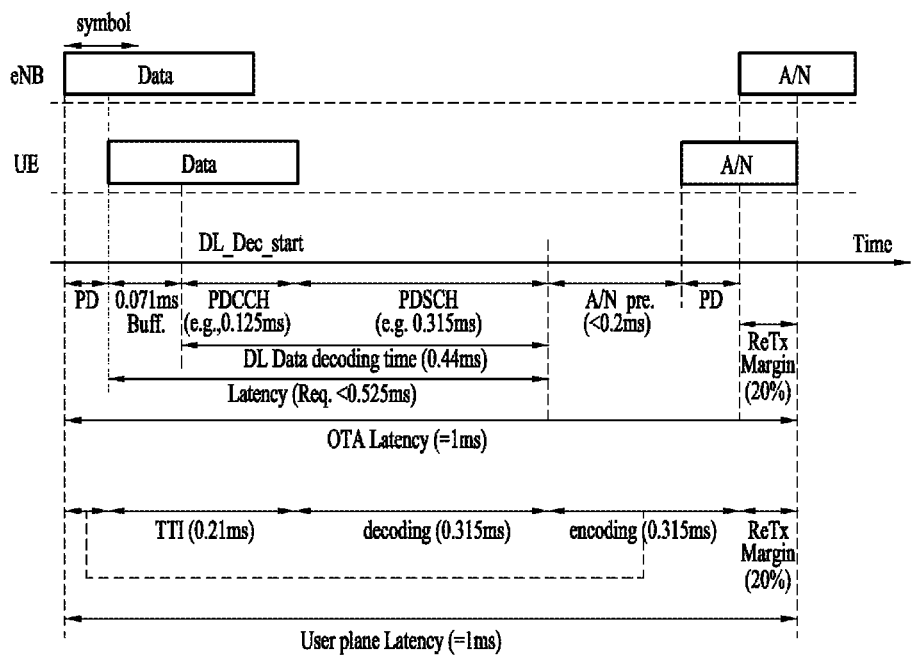
FIG. 5 illustrates a decrease in the length of a TTI according to reduction in user-plane latency.

To satisfy a reduction in the above-described latency, i.e., low latency, a TTI, which is a minimum unit for data transmission, needs to be newly designed to be reduced to a shortened TTI (sTTI) which is equal to or less than 0.5 msec (ms). For example, as illustrated in FIG. 5, in order to reduce user-plane (U-plane) latency to 1 ms until the UE completes transmission of ACK/NACK (A/N) since the eNB has started transmission of data (a PDCCH and a PDSCH), the sTTI may be configured in units of about 3 OFDM symbols.

Figure 6:
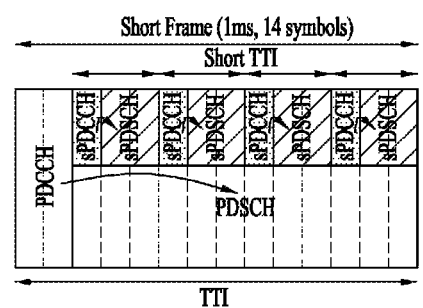
FIG. 6 illustrates an example of configuring a plurality of short TTIs in one subframe.

In a DL environment, a PDCCH for data transmission/scheduling within the sTTI (i.e., a sPDCCH) and a PDSCH for transmitting data within the sTTI (i.e., a sPDSCH) may be transmitted. For example, as illustrated in FIG. 6, a plurality of sTTIs may be configured using different OFDM symbols in one subframe. Characteristically, OFDM symbols in which legacy channels are transmitted may be excluded from OFDM symbols constituting an sTTI. The sPDCCH and the sPDSCH within the sTTI may be transmitted in different OFDM symbol regions by being time-division-multiplexed (TDMed) or may be transmitted in different PRBs or on different frequency resources by being frequency-division-multiplexed (FDMed).

In the present disclosure, a description is given based on an LTE/LTE-A system. In a legacy LTE/LTE-A system, a 1-ms subframe may include 14 OFDM symbols in the case of a normal CP. If the 1-ms subframe is configured by TTIs shorter than 1 ms, one subframe may include a plurality of TTIs. As in examples illustrated in FIG. 7, 2 symbols, 3 symbols, 4 symbols, or 7 symbols may constitute one TTI. Although not illustrated, the case in which one symbol constitutes one TTI may be considered. If one symbol constitutes one TTI unit, 12 TTIs are generated under the assumption that legacy PDCCHs are transmitted in two OFDM symbols. Similarly, as illustrated in (a) of FIG. 7, if two symbols constitute one TTI unit, 6 TTIs may be generated. As illustrated in (b) of FIG. 7, if 3 symbols constitute one TTI unit, 4 TTIs may be generated. As illustrated in (c) of FIG. 7, if 4 symbols constitute one TTI unit, 3 TTIs may be generated. In this case, it is assumed that legacy PDCCHs are transmitted in the first starting two OFDM symbols.

As illustrated in (d) of FIG. 7, in the case in which 7 symbols constitute one TTI, 7 symbols including legacy PDCCHs may constitute one TTI and 7 subsequent symbols may constitute one TTI. If one TTI includes 7 symbols, a UE supporting an sTTI assumes that, in a TTI located at a front part of one subframe (i.e., the first slot), front two OFDM symbols in which legacy PDCCHs are transmitted are punctured or rate-matched and that data of the UE and/or control information is transmitted in 5 symbols subsequent to the front two symbols. In contrast, the UE assumes that, in a TTI located at a rear part of one subframe (i.e., the second slot), data and/or control information may be transmitted in all of 7 symbols without a punctured or rate-matched resource region.

Figure 8:
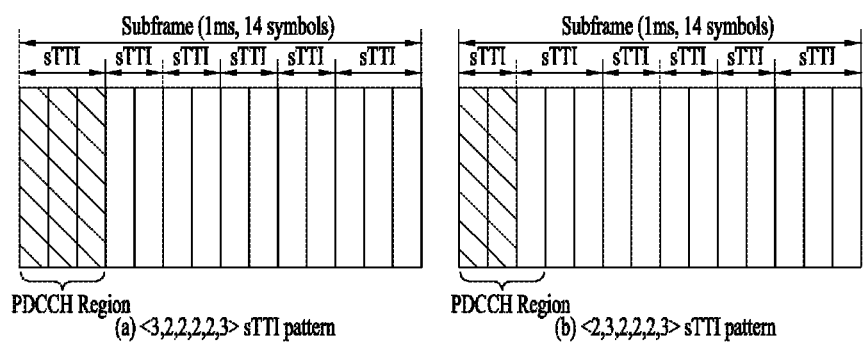
FIG. 8 illustrates the structures of DL subframes including short TTIs of 2 and 3 symbols.

The present disclosure considers an sTTI structure in which an sTTI including 2 OFDM symbols (hereinafter, OFDM symbols are referred to as "OSs") and an sTTI including 3 OSs are mixed in one subframe as illustrated in FIG. 8. In this way, an sTTI including 2 OSs or 3 OSs may be simply defined as 2-symbol sTTI (i.e., a 2-OS sTTI). In a <3,2,2,2,2,3> sTTI pattern illustrated in (a) of FIG. 8, an sPDCCH may be transmitted according to the number of symbols of a PDCCH. In a <2,3,2,2,2,3> sTTI pattern illustrated in (b) of FIG. 8, it may be difficult to transmit the sPDCCH due to a legacy PDCCH region.

Soft Buffer Management

In the legacy LTE/LTE-A system, a TTI has a fixed length of 1 ms, and a UE is designed to have a maximum of 8 HARQ processes in consideration of HARQ timings. The 8 HARQ processes may mean that when there is one serving cell and a single codeword is used, the entire region of a soft buffer possessed by a UE can be divided into 8 portions. That is, the number of buffers that a UE can use and the minimum amount of data that should be stored in one buffer are defined in specifications. Specifically, the following reference describes an example of the conventional soft buffer partitioning method in a carrier aggregation (CA) environment. As shown in the reference below, in the conventional CA environment, a UE divides the total number of soft channel bits ($N_{soft}$) by the number of serving DL cells configured for the UE ($N_{cells}^{DL}$) to allocate a soft buffer region with the same size ($N'_{soft}/N_{cells}^{DL}$) to each serving DL cell. Thereafter, the soft buffer region ($N_{soft}/N_{cells}^{DL}$) allocated to each serving DL cell is divided again by the maximum number of DL HARQ processes per serving DL cell ($M_{DL\_HARQ}$) (the number of code blocks per serving DL cell ($N_{cb}$) and/or the value of $K_{MIMO}$ per serving DL cell (i.e., when one of TMs 3, 4, 8, 9, and 10 is configured, the value of $K_{MIMO}$ is set to 2, and otherwise, the value of $K_{MIMO}$ is set to 1)). The value of $M_{DL\_HARQ}$ of a specific serving DL cell is determined by DL reference HARQ timeline information (or DL reference HARQ configuration information), and $M_{limit}$ is a constant with a value of 8.

[Reference 1]

---

7.1.8 Storing soft channel bits

For FDD, TDD and FDD-TDD, if the UE is configured with more than one serving cell or if the UE is configured with a SCG, then for each serving cell, for at least $K_{MIMO} \cdot \min(M_{DL\_HARQ}, M_{limit})$ transport blocks, upon decoding failure of a code block of a tranport block, the UE shall store received soft channel bits corresponding to a range of at least $w_k\ w_{k+1}, \ldots, w_{mod(k+n_{SB}-1,N_{cb})}$, where:

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor \right),$$

$w_k$, $C$, $N_{cb}$, $K_{MIMO}$, , and $M_{limit}$ are defined in subclause 5.1.4.1.2 of [4]. $M_{DL\_HARQ}$ is the maximum number of DL HARQ processes.
If the UE is configured with a SCG
  $N_{cells}^{DL}$ is the number of configured serving cells across both MCG and SCG.
else
  $N_{cells}^{DL}$ is the number of configured serving cells.
If the UE signals ue-CategoryDL-r12, $N_{soft}'$ is the total number of soft channel bits [12] according to the UE category indicated by ue-CategoryDL-r12 [11]. Else if the UE signals ue-Category-v1170 and not ue-CategoryDL-r12, $N_{soft}'$ is the total number of soft channel bits [12] according UE category indicated by ue-Category-v1170 [11]. Else if the UE signals ue-Category-v1020 and not ue-Category-v1170 and not ue-CategoryDL-r12, $N_{soft}'$ is the total number of soft channel bits [12] according to the UE category indicted by the ue-Category-v1020 [11]. Otherwise, $N_{soft}'$ is the total number of soft channel bits [12] according to the UE category indicted by ue-Category (without suffix) [11].
In determining k, the UE should give priority to storing soft channel bits corresponding to lower values of k. $w_k$ shall correspond to a received soft channel bit. The range $w_k\ w_{k+1}, \ldots, w_{mod(k+n_{SB}-1,N_{cb})}$ may include subsets not containing received soft channel bits.

---

Minimum Buffer Requirement

The minimum number of soft bits that a UE should store in a buffer for a specific code block is determined by $w_k$ $w_{k+1}, \ldots, w_{mod(k+n_{SB,m}-1)}$, $N_{CB}$). In this case, $n_{SB,m}$ may be defined as shown in Equation 1.

$$n_{SB,m} = \min\left(N_{cb}, \left\lfloor \frac{N'_{soft,m}}{C \cdot N_{cells}^{DL} K_{MIMO,m} \min(M_{DL\_HARQ,m}, M_{limit})} \right\rfloor \right) \quad \text{[Equation 1]}$$

In Equation 1, $N'_{soft,m}$ indicates the maximum size of a soft buffer that can be occupied by HARQ processes corresponding to an m-th TTI length, and $M_{DL\_HARQ,m}$ indicates the maximum number of DL HARQ processes corresponding to the length-m TTI.

Option 1-1: It may be regulated that part of a soft buffer is divided to perform buffering of $M_1$ code blocks with the same size as the conventional one and the rest of the soft buffer is divided to perform buffering of M2 code blocks with a different size from the conventional one. That is, it may be regulated that $n_{SB,1}$ is set to be equal to $n_{SB}$. When a soft buffer is divided as described above, if initial transmission is scheduled with a 2-symbol TTI and retransmission is scheduled with a 1 ms TTI, a UE expects that a HARQ process ID, which corresponds to a buffer divided by the size of $n_{SB,1}$, will be scheduled. When this method is applied, there may be no restriction on the maximum transport block size (TBS) for a first TTI length, but the maximum number of DL HARQ processes for the first TTI length is limited to $M_1$ less than M. $n_{SB,2}$ may be configured such that the remaining soft buffer region for a second TTI length is divided into (M-$M_1$) portions, and the maximum TBS supportable for the second TTI length may be calculated therefrom. M1 and M2 may be predefined or configured for the UE through a higher layer signal (or physical layer signal). If the UE's maximum soft buffer size is fixed regardless of whether a specific TTI length or a specific processing time is configured, the UE expects that the network performs scheduling such that the sum of $N'_{soft,m}$ does not exceed $N'_{soft}$.

Option 1-2: It may be regulated that part of a soft buffer is divided to perform buffering of $M_1$ code blocks with a different size from the conventional one and the rest of the soft buffer is divided to perform buffering of M2 code blocks with another different size but $n_{SB,1}$ is set different from n $n_{SB}$. If the maximum soft buffer size possessed by a UE is fixed regardless of whether a specific TTI length or a specific processing time is configured, $M_1(=M)$ may be configured such that the maximum number of DL HARQ processes supported for the 1 ms TTI (or reference TTI length) is maintained. When this method is applied, a restriction on the maximum TBS for the first TTI length may be enabled, or performance degradation may occur when retransmission is performed for specific transmission with the first TTI length. M1 and M2 may be predefined or configured for the UE through a higher layer signal (or physical layer signal).

Option 1-3: It may be regulated that when a UE is configured with a specific TTI length (e.g., a TTI length other than the 1 ms TTI or reference TTI length) and/or a specific processing time (e.g., a processing time other than the reference processing time or minimum processing time) (here, the processing time may mean a time required from DL data reception to DL HARQ transmission and/or a time required from UL grant reception to UL data transmission), the entire region of a soft buffer configured for the corresponding UE is set to be larger than when no specific TTI length and/or no specific processing time is configured ($N'_{new}$). When the specific TTI length and/or the specific processing time is configured, operation may be performed as if one carrier was additionally aggregated. Thus, it may be regulated that the number of cells where CA can be supported is set to be smaller than that when no specific TTI length and/or no specific processing time is configured. More generally, it may be regulated that a soft buffer has a different region depending on whether a specific TTI length and/or a specific processing time is (additionally) configured for each cell.

Option 1-4: It may be regulated that when a UE is configured with a specific TTI length (e.g., a TTI length other than the 1 ms TTI or reference TTI length) and/or a specific processing time (e.g., a processing time other than the reference processing time or minimum processing time) (here, the processing time may mean a time required from DL data reception to DL HARQ transmission and/or a time required from UL grant reception to UL data transmission), a soft buffer is divided by considering the maximum TBS supportable for the specific TTI length and/or the specific processing time. For example, assuming that a 2-symbol TTI (m=2) is configured and the ratio between maximum TBSs is 1:6 with respect to the 1 ms TTI (m=1), a soft buffer may be divided as follows: $N'_{soft,1} = 6/7 N'_{soft}$ and $N'_{soft,2} = 1/7 N'_{soft}$. If the ratio between the maximum TBS for the first TTI length and the maximum TBS for the second TTI length is α:β, $n_{SB,1}$ and $n_{SB,2}$ may be represented as follows:

$$n_{SB,1} = \min\left(N_{cb}, \left\lfloor \frac{N'_{soft} \cdot \alpha/(\alpha+\beta)}{C \cdot N^{DL}_{cells} K_{MIMO,1} \min(M_{DL\_HARQ,1}, M_{limit})} \right\rfloor\right) \text{ and}$$

$$n_{SB,2} = \min\left(N_{cb}, \left\lfloor \frac{N'_{soft} \cdot \beta/(\alpha+\beta)}{C \cdot N^{DL}_{cells} K_{MIMO,2} \min(M_{DL\_HARQ,2}, M_{limit})} \right\rfloor\right).$$

As another method, it may be regulated that a soft buffer is divided according to the ratio between TTI lengths.

Option 1-5: It may be regulated that when a UE is configured with a specific TTI length (e.g., a TTI length other than the 1 ms TTI or reference TTI length) and/or a specific processing time (e.g., a processing time other than the reference processing time or minimum processing time) (here, the processing time may mean a time required from DL data reception to DL HARQ transmission and/or a time required from UL grant reception to UL data transmission), a soft buffer is divided by considering the maximum number of DL HARQ processes for each TTI length or processing time. For example, assuming that the maximum number of DL HARQ processes for the first TTI length is 8 and the maximum number of DL HARQ processes for the second TTI length is 16, a soft buffer may be divided as follows: $N'_{soft,1} = \frac{1}{3} N'_{soft}$ and $N'_{soft,2} = \frac{2}{3} N'_{soft}$. If the ratio between the maximum number of DL HARQ processes for the first TTI length and the maximum number of DL HARQ processes for the second TTI length is α:β, $n_{SB,1}$ and $n_{SB,2}$ may be represented as follows:

$$n_{SB,1} = \min\left(N_{cb}, \left\lfloor \frac{N'_{soft} \cdot \alpha/(\alpha+\beta)}{C \cdot N^{DL}_{cells} K_{MIMO,1} \min(M_{DL\_HARQ,1}, M_{limit})} \right\rfloor\right) \text{ and}$$

$$n_{SB,2} = \min\left(N_{cb}, \left\lfloor \frac{N'_{soft} \cdot \beta/(\alpha+\beta)}{C \cdot N^{DL}_{cells} K_{MIMO,2} \min(M_{DL\_HARQ,2}, M_{limit})} \right\rfloor\right).$$

As another method, it may be regulated that a soft buffer is divided by considering the maximum value among the maximum numbers of DL HARQ processes for individual TTI lengths or processing times.

Option 1-6: Regardless of the maximum number of DL HARQ processes configured for a UE, $M_{limit}$ may be fixed to 8 to divide a soft buffer into up to 8 portions for a DL HARQ process. When a UE is configured with a specific TTI length (e.g., a TTI length other than the 1 ms TTI or reference TTI length) and/or a specific processing time (e.g., a processing time other than the reference processing time or minimum processing time) (here, the processing time may mean a time required from DL data reception to DL HARQ transmission and/or a time required from UL grant reception to UL data transmission), a value different from $M_{limit}$, which is used for the reference TTI length (e.g., 1 ms TTI) and/or the reference processing time, may be predefined or configured for the UE through a higher layer signal (or physical layer signal). For example, when the specific TTI length and/or the specific processing time is configured, $n_{SB}$ may be newly defined as follows:

$$n_{SB} = \min\left(N_{cb}, \left\lfloor \frac{N'_{soft}}{C \cdot N^{DL}_{cells} K_{MIMO} \min\{\max_m(M_{DL\_HARQ,m}), M_{limit}\}} \right\rfloor\right).$$

Option 1-7: When a UE is configured with a specific TTI length (e.g., a TTI length other than the 1 ms TTI or reference TTI length) and/or a specific processing time (e.g., a processing time other than the reference processing time or minimum processing time) (here, the processing time may mean a time required from DL data reception to DL HARQ transmission and/or a time required from UL grant reception to UL data transmission), it may be interpreted to mean that one (or multiple) carrier is additionally aggregated, and a value different from $N_{cells}^{DL}$ (the number of DL cells), which is used for the reference TTI length (e.g., 1 ms TTI) and/or the reference processing time, may be predefined or configured for the UE through a higher layer signal (or physical layer signal). For example, when the specific TTI length and/or the specific processing time is configured, $n_{SB}$ may be newly defined as follows:

$$n_{SB} = \min\left(N_{cb}, \left\lfloor \frac{N'_{soft}}{C \cdot (N^{DL}_{cells}+k) K_{MIMO} \min(M_{DL\_HARQ}), M_{limit}} \right\rfloor\right),$$

where k may be an integer greater than 1.

Option 1-8: When a UE is configured with a specific TTI length (e.g., a TTI length other than the 1 ms TTI or reference TTI length) and/or a specific processing time (e.g., a processing time other than the reference processing time or minimum processing time) (here, the processing time may mean a time required from DL data reception to DL HARQ transmission and/or a time required from UL grant reception to UL data transmission), the soft buffer size for code blocks ($N_{cb}$) may be changed.

Option 1-9: The soft buffer size for code blocks ($N_{cb}$) is determined according to the soft buffer size for a transport block (TB). In this case, the soft buffer size for the TB is defined as $$N_{IR} = \left\lfloor \frac{N_{soft}}{K_C \cdot K_{MIMO} \min(M_{DL\_HARQ}, M_{limit})} \right\rfloor,$$

where indicates the total number of soft channel bits depending on the UE category (cf. Table 4.4-1 of TS 36.306). When a UE is configured with a specific TTI length (e.g., a TTI length other than the 1 ms TTI or reference TTI length) and/or a specific processing time (e.g., a processing time other than the reference processing time or minimum processing time) (here, the processing time may mean a time required from DL data reception to DL HARQ transmission and/or a time required from UL grant reception to UL data transmission), the soft buffer size for the TB $N_{IR}$ may vary depending on whether the specific TTI length and/or the specific processing time is configured. For example, a value different from $K_C$, which is used for the reference TTI length (e.g., 1 ms TTI) and/or the reference processing time, may be predefined or configured for the corresponding UE through a higher layer signal (or physical layer signal).

Option 1-10: For data corresponding to a service with high reliability, it may not be desired to drop soft bits due to an insufficient soft buffer. Thus, it may be regulated that a soft buffer is divided differently depending on the service type/priority (target signal-to-interface noise ratio (SINR), target block error ratio (BLER), etc.) of a data channel. For example, it may be regulated that in the case of data with high reliability, all soft bits are stored in a soft buffer and in the case of data with low reliability, they are stored in other buffers. Alternatively, it may be regulated that a separate HARQ process number is allocated depending on the service type/priority (target SINR, target BLER, etc.) of a data channel. Further, it may be regulated that in the case of a soft buffer for a HARQ process number corresponding to a specific service type/priority (target SINR, target BLER, etc.), the minimum requirement is prioritized and the soft buffer is emptied later.

Option 1-11: It may be regulated that a soft buffer is divided differently depending on UE capability. For example, the minimum buffer requirement may be set differently depending on whether a UE can simultaneously decode a PDSCH and a sPDSCH, which have different TTI lengths. In addition, the entire region of a soft buffer of a UE capable of simultaneously decoding a PDSCH and a sPDSCH, which have different TTI lengths, may be set to be larger than the entire region of a soft buffer ($N'_{soft}$) of a UE incapable of performing the decoding.

Figure 9:
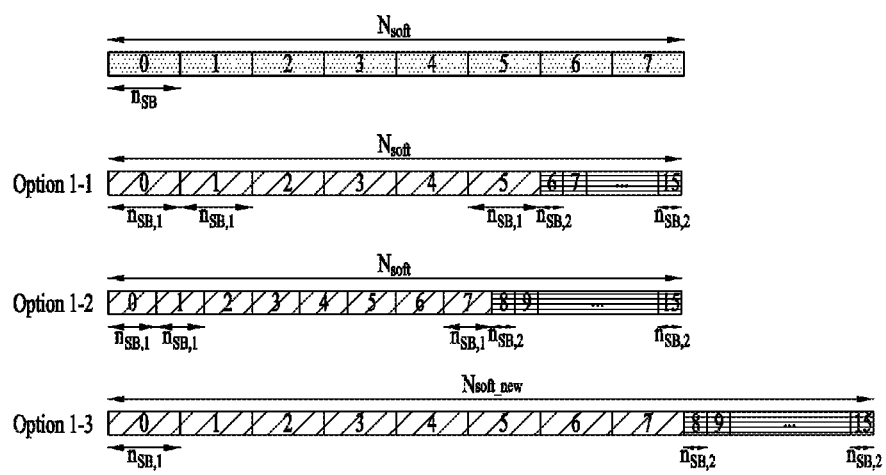
FIG. 9 illustrates the size of a soft buffer.

Although it is assumed in FIG. 9 that HARQ processes are shared different TTI lengths, the same soft buffer partitioning may be applied when different HARQ processes are used for different TTI lengths except allocation of HARQ process numbers.

The above options may be applied in a similar way when HARQ processes are shared or distinguished for different numerologies.

Herein, the numerology may mean a TTI length or subcarrier spacing to be applied to a wireless communication system, a parameter indicating a fixed TTI length or subcarrier spacing, a communication architecture, or a system based thereon.

Operation Based on Different TTI Length Between Initial Transmission and Retransmission When the TTI length of initial transmission is different from that of retransmission, the following HARQ-ACK feedback method may be considered. Specifically, if a sPDSCH with a sTTI is scheduled and a NACK therefor is reported in initial transmission, a PDSCH with a legacy TTI may be scheduled for retransmission. In this case, a sPUCCH may be set as a HARQ-ACK container for latency reduction.

Soft Buffer Management When Multiple TTI Lengths are Supported

Figure 10:
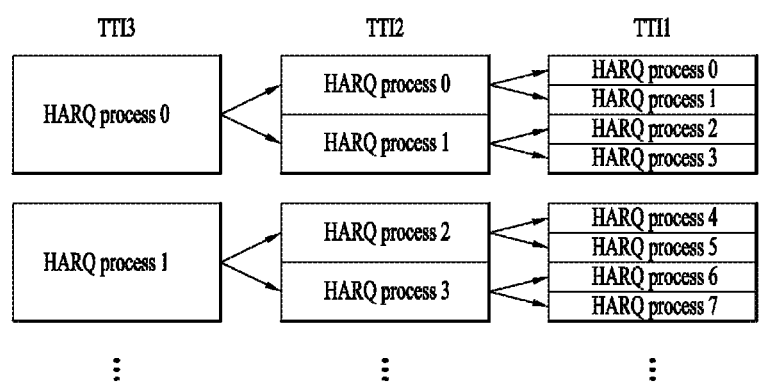
FIG. 10 illustrates a mapping relationship between a TTI length and a HARQ process.

It may be regulated that when a UE supports multiple TTI lengths (or subcarrier spacings), the UE configures HARQ process IDs with respect to the longest TTI length among the multiple TTI lengths, divides a soft buffer according to the HARQ process IDs, and maps a HARQ process ID for each of the remaining TTI lengths to the divided soft buffer. In other words, it may be regulated that HARQ process IDs are configured with respect to the longest TTI length among multiple TTI lengths, a plurality of HARQ process IDs for short TTI lengths are mapped to one HARQ process ID, and/or a nested structure is used in the case of the short TTI lengths. FIG. 10 illustrates TTI length-to-HARQ process mapping in such a nested structure.

For example, it is assumed that in the case of TTI 1<TTI 2<TTI 3, 8 HARQ processes are configured with respect to TTI 3, a soft buffer is divided into N portions, and a HARQ process ID is mapped to each portion. If the number of HARQ processes for TTI 2 is set to 16, and the number of HARQ processes for TTI 1 is set to 32, it may be regulated that HARQ processes 0 and 1 for TTI 2 are mapped to HARQ process 0 for TTI 3 and HARQ processes 0 and 1 for TTI 1 are mapped to HARQ process 0 for TTI 2.

When a HARQ process is configured for semi-persistent scheduling (SPS) transmission with a specific TTI length, a HARQ process with a different TTI length (e.g., longer than the specific TTI length), which is mapped to the corresponding HARQ process, may be used for different transmission (e.g., grant-based transmission). In this case, it may be regulated that a soft buffer is used by excluding part thereof required for the SPS transmission with the specific TTI length. For example, assuming that TTI 1<TTI 2, if HARQ process 0 for TTI 2 is mapped to HARQ processes 0 and 1 for TTI 1 and HARQ process 0 for TTI 1 is set as a HARQ process for SPS transmission, a partial soft buffer corresponding to HARQ process 0 for grant-based transmission operating based on TTI 2 may be obtained by excluding the minimum requirement for HARQ process 0 for TTI 1. Alternatively, the partial soft buffer corresponding to HARQ process 0 for the grant-based transmission operating based on TTI 2 may be predefined or configured by a higher layer signal (or physical layer signal).

More generally, the (minimum required) size of a soft buffer corresponding to one HARQ process may be determined differently depending on usage (e.g., grant-based transmission or SPS transmission). In this case, the size may be configured differently for each TTI length.

As another method, it may be regulated that part of a soft buffer for specific transmission is separately reserved for a specific TTI length and the rest of the soft buffer is shared between other TTI lengths.

UCI Repetition (Transmission)

When a UE is configured with a sTTI, a short HARQ round-trip time may be expected since HARQ-ACK for a DL channel is transmitted over a sPUCCH, thereby achieving short-delay communication. UE's coverage and latency are in a trade-off relationship. That is, if a short UL TTI length is configured for latency reduction, a UE may perform UL transmission with the short UL TTI, but the transmission is only feasible within small coverage. When a long UL TTI length is configured for coverage extension, a UE may transmit more bits of information on a sPUCCH, but latency may be relatively increased.

The length of a UL sTTI may be dynamically changed by a physical layer signal or semi-statically configured by a higher layer signal. When a sPUCCH needs to be transmitted with a high coding rate to support a large payload (e.g., in the case of CA), if the UL sTTI length is capable of being dynamically changed, a PUCCH with a long TTI length may be used for transmission. However, it may be desirable that the UL sTTI length is configured semi-statically for simple network and UE operation. In this case, more frequency and/or time resources need to be used for HARQ-ACK transmission to increase the reliability of the sPUCCH transmission. As an example of using more frequency resources, a multi-PRB PUCCCH format may be considered, and as an example of using more time resources, HARQ-ACK repetition may be considered. In the case of the multi-PRB PUCCH format, there is no increase in latency. However, if a UE is in a power-limited situation, the effect of coverage extension may be cancelled. Thus, the present disclosure proposes that when a UE is configured with a sTTI, the UE performs HARQ-ACK repetition. In the current LTE specifications, the HARQ-ACK repetition has been defined as follows.

[Reference 2]

---

10.1.4 HARQ-ACK Repetition procedure

For a non-BL/CE UE, HARQ-ACK repetition is enabled or disabled by a UE specific parameter ackNackRepetition configured by higher layers. Once enabled, the UE shall repeat any HARQ-ACK 10.1.4 HARQ-ACK Repetition procedure transmission with a repetition factor $N_{ANRep}$, where $N_{ANRep}$ is provided by higher layers and includes the initial HARQ-ACK transmission, until HARQ-ACK repetition is disabled by higher layers. For a PDSCH transmission without a corresponding PDCCH/EPDCCH detected, the UE shall transmit the corresponding HARQ-ACK response $N_{ANRep}$ times using PUCCH resource $n_{PUCCH}^{(\tilde{i},\tilde{p})}$ configured by higher layers. For a PDSCH transmission with a corresponding PDCCH/EPDCCH detected, or for a PDCCH/EPDCCH indicating downlink SPS release, the UE shall first transmit the corresponding HARQ-ACK response once using PUCCH resource derived from the corresponding PDCCH CCE index or EPDCCH ECCE index (as described in subclauses 10.1.2 and 10.1.3), and repeat the transmission of the corresponding HARQ-ACK response $N_{ANRep}-1$ times always using PUCCH resource $n_{PUCCH,\,ANRep}^{(\tilde{i},\tilde{p})}$, where $n_{PUCCH,\,ANRep}^{(\tilde{i},\tilde{p})}$ is configured by higher layers.
HARQ-ACK repetition is only applicable for UEs configured with one serving cell for FDD and TDD. For TDD, HARQ-ACK repetition is only applicable for HARQ-ACK bundling.
HARQ-ACK repetition can be enabled with PUCCH format 1a/1b on two antenna ports. For a UE configured for two antenna port transmission for HARQ-ACK repetition with PUCCH format 1a/1b, a PUCCH resource value $n_{PUCCH,\,ANRep}^{(\tilde{i},\tilde{p})}$ maps to two PUCCH resources with the first PUCCH resource $n_{PUCCH,ANRep}^{(\tilde{i},\tilde{p}_0)}$ for antenna port $p_0$ and the second PUCCH resource $n_{PUCCH,ANRep}^{(\tilde{i},\tilde{p}_1)}$ for antenna port $p_1$, otherwise, the PUCCH resource value maps to a single PUCCH resource $n_{PUCCH,ANRep}^{(\tilde{i},\tilde{p}_0)}$ for antenna port $p_0$.

A UE may repeatedly transmit a specific sPUCCH during a specific number of TTIs (which are predefined or signaled). For the sPUCCH (transmission) repetition, the following methods may be considered. It may be regulated that an eNB configures whether a UE is allowed to perform the sPUCCH repetition and informs the UE of the result through a higher layer signal (or physical layer signal). In addition, when the sPUCCH repetition is allowed, the following items may be predefined or configured by the eNB through a higher layer signal/physical layer signal. The items may include: the location of a TTI where the repeated sPUCCH is to be transmitted; the number of TTIs for transmitting the repeated sPUCCH; information on resources for transmitting the repeated sPUCCH; and information indicating whether the conventional mapping is applied, that is, whether extra resources are used for the transmission.

When a UE is configured with a sTTI, sPUCCH repetition should be dynamically enabled for the above-described reasons. In the following, a description will be given of conditions for triggering/enabling the sPUCCH repetition. Although the present disclosure is described focusing on HARQ-ACK repetition, the disclosure is also applicable when normal UCI is repeated.

If the UE configured with the sTTI has a HARQ-ACK payload size equal to or greater than a predetermined value, the HARQ-ACK repetition may be dynamically triggered. As another method, if the UE configured with the sTTI has a HARQ-ACK coding rate equal to or greater than a predetermined value, the HARQ-ACK repetition may be dynamically triggered. In this case, the number of times of the HARQ-ACK repetition may be implicitly determined by the HARQ-ACK payload size or coding rate.

The number of times of the HARQ-ACK repetition may be configured through a higher layer signal, and the final number of times of the HARQ-ACK repetition and whether the HARQ-ACK repetition is triggered may be indicated by a physical layer signal. As another method, the number of times of the HARQ-ACK repetition may be tied to a (s)PUCCH resource (set) configured through a higher layer signal, and the final number of times of the HARQ-ACK repetition and whether the HARQ-ACK repetition is triggered may be indicated by a physical layer signal.

It may be regulated that when multiple serving cells are configured for the UE configured with the sTTI, the HARQ-ACK repetition is enabled. In other words, even in the CA environment where multiple serving cells are configured, the UE configured with the sTTI may be allowed to perform the HARQ-ACK repetition.

It may be regulated that when the UE is configured with the sTTI, the HARQ-ACK repetition is enabled through a physical layer signal (e.g., DCI). For example, a separate ACK/NACK resource indicator (ARI) field may be defined, and each state of the corresponding ARI may indicate a predetermined PUCCH resource. In this case, each state may be configured to indicate whether the HARQ-ACK repetition is enabled. By doing so, whether the HARQ-ACK repetition is enabled may be indicated by transmitting the ARI to the UE. As another example, a separate (1-bit) field for indicating whether the HARQ-ACK repetition is enabled may be added in order to inform the UE whether the HARQ-ACK repetition is enabled.

If the UE configured with the sTTI performs the HARQ-ACK repetition too many times, it may not be desirable in terms of latency reduction. Thus, when the UE configured with the sTTI is allowed to perform the HARQ-ACK repetition, frequency hopping may be applied. In this case, as a sPUCCH resource to be transmitted by the frequency hopping, a different resource may be used every TTI or every x TTIs, and the resource determination may be predefined or performed according to an offset indicated by a higher layer signal or physical layer signal. In this case, the number of TTIs during which the same sPUCCH resource is maintained may be (1) predefined, (2) indicated by a higher layer signal or physical layer signal, or (3) implicitly determined by the number of times of the HARQ-ACK repetition.

As another method, it may be regulated that frequency hopping patterns are preconfigured through a higher layer signal and a final frequency hopping pattern is indicated through a physical layer signal. Alternatively, sPUCCH transmission resources used for the HARQ-ACK repetition may be determined by a predefined hopping pattern. The frequency hopping pattern may be determined differently depending on the number of times of repetitions.

It may be regulated that only when the frequency hopping is enabled, the HARQ-ACK repetition is performed less times than the number of times of the HARQ-ACK repetition, which is predefined or signaled. For example, it may be regulated that when the number of times of the HARQ-ACK repetition is set to 4, if a UE is enabled to perform the frequency hopping, the number of times of the HARQ-ACK repetition is reduced to 2.

If the transmission timing of the sPUCCH overlap with the transmission timing of a legacy PUSCH, a legacy PUCCH, a sPUSCH, or an SRS even though sufficient power is allocated for the sPUCCH transmission, the power-limited situation may occur. Thus, it may be regulated that when the transmission timing of the sPUCCH overlaps with transmission timings of other channels, the transmission of other channels is dropped/stopped and the sPUCCH repetition is enabled. Specifically, the above rule may be enabled when the sPUCCH overlaps with a specific channel or when the sPUCCH overlaps with a specific number of channels. Alternatively, it may be regulated that when the HARQ-ACK repetition for the sPUCCH is enabled, if the sPUCCH overlaps with a different channel(s), the sPUCCH is prioritized and the different channel(s) is dropped/stopped. As another method, it may be regulated that only when the transmission timing of the sPUCCH overlaps with transmission timings of other channels and the power-limited situation occurs, the HARQ-ACK repetition is enabled.

It may be regulated that if the transmission timing of the sPUCCH overlap with the transmission timing of a legacy PUCCH, a legacy PUSCH, or a sPUSCH, UCI for the legacy PUSCH, legacy PUCCH, or sPUSCH is transmitted together on the sPUCCH. In this case, UCI repetition may be enabled. In addition, it may be regulated that when the total payload size or coding rate for both "UCI for the legacy PUSCH, legacy PUCCH, or sPUSCH" and "UCI for the sPUCCH" is equal to or greater than a predetermined level, the UCI repetition is enabled.

It may be regulated that when the UE's HARQ-ACK repetition is enabled, if the transmission timing of the sPUCCH overlaps with the transmission timing of a legacy PUCCH, a legacy PUSCH, or a sPUSCH, the sPUCCH related to the HARQ-ACK repetition is prioritized and other channels are dropped/stopped.

The above-described UCI repetition may be dynamically enabled only when the network informs the configuration of the UCI repetition through a higher layer signal (e.g., radio resource control (RRC) signaling). In this case, the corresponding higher layer signal may correspond to the conventional one where "ackNackRepetition" signaling is configured. Alternatively, a separate signal for signaling the UCI repetition configuration (for the sTTI or a specific TTI length) may be defined.

Although the above proposal relates to the UCI repetition (transmission) of the UE configured with the sTTI, the proposal is also applicable when UCI needs to be transmitted on many resources in accordance with the payload size or coding rate in a situation that a specific TTI length or a specific numerology is configured.

When UCI repetition is dynamically enabled as described above, a UE may not necessarily transmit a DM-RS for a sPUCCH every (s)TTI. That is, if the same frequency allocation is applied within the repetition interval, more REs may be used for UCI transmission by sharing the DM-RS. Thus, it may be regulated that when the UCI repetition is dynamically enabled as described above, a DM-RS is transmitted in an (s)TTI and/or a symbol, which is predefined and/or signaled through a physical/higher layer signal. In this case, it may be regulated that frequency hopping in (s)TTIs where repeated transmission is performed is disabled.

Alternatively, the DM-RS sharing in the (s)TTIs where the repeated transmission is performed may be enabled through a higher/physical layer signal. In this case, it may be regulated that the frequency hopping in the (s)TTIs where the repeated transmission is performed is disabled. Further, the frequency hopping in the (s)TTIs where the repeated transmission is performed may be disabled through a higher/physical layer signal, and in this case, it may be regulated that the DM-RS sharing in the (s)TTIs where the repeated transmission is performed is enabled.

This proposal can be equally applied when the UCI repetition is semi-statically enabled.

It may be regulated that when the UCI repetition is dynamically or semi-statically enabled as described above, if some or all of the corresponding transmission overlaps with another UL channel (e.g., a PUSCH, a sPUSCH, or a PUCCH) in the time domain, a UE drops the UCI repetition transmission channel in an overlapping (s)TTI among the (s)TTIs where the repeated transmission is performed. In this case, the drop operation may be applied only when the power-limited situation occurs. Alternatively, it may be regulated that when the overlapping channel is a data transmission channel (e.g., a (s)PUSCH) and has the same TTI length as the UCI repetition transmission channel, UCI for the UCI repetition transmission channel is piggybacked on the data transmission channel. Further, it may be regulated that when simultaneous transmission is configured, the UCI repetition transmission channel is simultaneously transmitted with another UL channel (e.g., a PUSCH, a sPUSCH, or a PUCCH). In this case, the simultaneous transmission may be applied except the power-limited situation.

Since each of the examples of the proposed methods may be included as one method for implementing the present disclosure, it is apparent that each example can be regarded as a proposed method. In addition, although the proposed methods can be implemented independently, some of the proposed methods can be combined (or merged) for implementation. Moreover, it may be regulated that information on whether the proposed methods are applied (or information on rules related to the proposed methods) should be transmitted from an eNB to a UE through a predefined signal (e.g., a physical layer signal, a higher layer signal, etc.).

Figure 11:
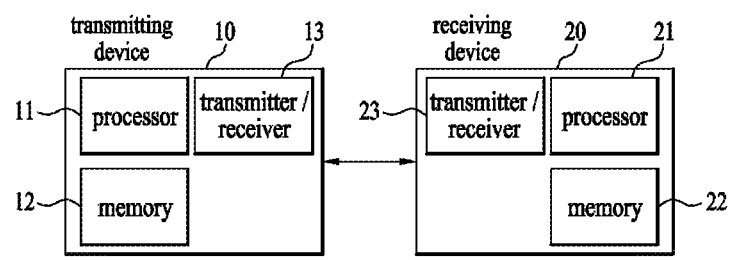
FIG. 11 is a block diagram for a device configured to implement embodiment(s) of the present disclosure.

FIG. 11 is a block diagram of a transmitting device 10 and a receiving device 20 configured to implement exemplary embodiments of the present disclosure. Referring to FIG. 6, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on uplink and as the receiving device 20 on downlink In embodiments of the present disclosure, an eNB serves as the receiving device 20 on uplink and as the transmission device 10 on downlink.

The transmitting device and/or the receiving device may be configured as a combination of one or more embodiments of the present disclosure.

In one of the embodiments, provided is a UE for supporting a plurality of TTIs, a plurality of subcarrier spacings, or a plurality of processing times in a wireless communication system. The UE may include a receiver, a transmitter, and a processor configured to control the receiver and the transmitter. The processor may be configured to receive the configuration of repeated transmission of HARQ-ACK information for a DL TB and transmit the HARQ-ACK information to an eNB according to the configuration of the repeated transmission when the repeated transmission is triggered. In this case, the repeated transmission may be triggered when a predetermined condition is satisfied.

When the UE is configured with a specific TTI length or a specific processing time, the size of a soft buffer for the DL TB may be determined by a parameter for the specific TTI length or the specific processing time.

The parameter may be different from a parameter for a reference TTI length or a reference specific processing time.

When the UE is configured with the specific TTI length or the specific processing time, the size of the soft buffer for the DL TB may be configured differently depending on the service type or priority of the DL TB.

When the UE is configured with the specific TTI length or the specific processing time, the number of identifiable HARQ processes may be configured differently depending on the service type or priority of the DL TB.

The repeated transmission may be triggered when the payload size or coding rate of the HARQ-ACK information is equal to or greater than a threshold.

The number of times of the repeated transmission may be determined according to the payload size or the coding rate.

The repeated transmission may be triggered when the UE is configured with a plurality of serving cells.

The repeated transmission may be triggered by a specific field in DCI related to the DL TB.

The repeated transmission may be trigged when the transmission timing of a UL channel for transmitting the HARQ-ACK information overlaps with that of a different UL channel.

Transmission of the different UL channel may be dropped or stopped.

UCI to be transmitted on the different UL channel may be transmitted together on the UL channel for transmitting the HARQ-ACK information.

The repeated transmission may be triggered when the transmission timing of the UL channel for transmitting the HARQ-ACK information overlaps with that of a different UL channel and when the payload size of the HARQ-ACK information and the payload size or coding rate of UCI to be transmitted on the different UL channel are equal to or greater than a threshold.

When the repeated transmission is triggered, UL resources for transmitting the HARQ-ACK information every a specific number of TTIs may be determined by frequency hopping.

A frequency hopping pattern may be determined according to the number of times of the repeated transmission.

When the repeated transmission is triggered, a DM-RS may be transmitted in a TTI or a symbol indicated by a higher layer signal or a physical layer signal.

When the repeated transmission is triggered, sharing of a DM-RS in TTIs where the repeated transmission is performed may be enabled by a higher layer signal or a physical layer signal.

When the repeated transmission is triggered and when the transmission timing of the UL channel for transmitting the HARQ-ACK information partially or completely overlaps with the transmitting timing of a different UL channel, HARQ-ACK information to be transmitted in a TTI(s) overlapping with the transmitting timing of the different UL channel among TTIs where the repeated transmission is performed may be dropped.

When the repeated transmission is triggered and when the transmission timing of the UL channel for transmitting the HARQ-ACK information partially or completely overlaps with the transmitting time of a different UL channel, the UL channel for transmitting the HARQ-ACK information and the different UL channel may be simultaneously transmitted.

As mentioned in the foregoing description, the detailed descriptions for the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations can be made therein without departing from the spirit and scope of the disclosure. Therefore, the present disclosure is not limited by the embodiments disclosed herein but intends to give the broadest scope matching the principles and new features disclosed herein.

INDUSTRIAL APPLICABILITY

The present disclosure may be used for a wireless communication apparatus such as a user equipment (UE), a relay and an eNB.

What is claimed is:

1. A method of transmitting uplink control information by a user equipment (UE) supporting a plurality of transmission time intervals (TTIs), a plurality of subcarrier spacings, or a plurality of processing times in a wireless communication system, the method comprising:
receiving a configuration of repeated transmission of acknowledgement/non-acknowledgement (HARQ-ACK) information for a downlink transport block; and
when the repeated transmission is triggered, transmitting the HARQ-ACK information to a base station according to the configuration of the repeated transmission,
wherein the repeated transmission is triggered when a predetermined condition is satisfied, and
wherein when the repeated transmission is triggered, uplink resources on which the HARQ-ACK information is to be transmitted in every specific number of TTIs are determined by frequency hopping.

2. The method of claim 1, wherein when the UE is configured with a specific TTI length or a specific processing time, a size of a soft buffer for the downlink transport block is determined by a parameter for the specific TTI length or the specific processing time.

3. The method of claim 1, wherein a parameter is different from a parameter for a reference TTI length or a reference specific processing time.

4. The method of claim 1, wherein when the UE is configured with a specific TTI length or a specific processing time, a size of a soft buffer for the downlink transport block is configured differently depending on a service type or priority of the downlink transport block.

5. The method of claim 1, wherein when the UE is configured with a specific TTI length or a specific processing time, the number of identifiable hybrid automatic retransmission request (HARQ) processes is configured differently depending on a service type or priority of the downlink transport block.

6. The method of claim 1, wherein the repeated transmission is triggered when a payload size or a coding rate of the HARQ-ACK information is equal to or greater than a threshold.

7. The method of claim 6, wherein the number of times of the repeated transmission is determined according to the payload size or the coding rate.

8. The method of claim 1, wherein the repeated transmission is triggered when the UE is configured with a plurality of serving cells.

9. The method of claim 1, wherein the repeated transmission is triggered by a specific field in downlink control information related to the downlink transport block.

10. The method of claim 1, wherein the repeated transmission is triggered when a transmission timing of an uplink channel for transmitting the HARQ-ACK information overlaps with a transmission timing of a different uplink channel.

11. The method of claim 10, wherein transmission of the different uplink channel is dropped or stopped.

12. The method of claim 10, wherein uplink control information to be transmitted on the different uplink channel is transmitted together on the uplink channel for transmitting the HARQ-ACK information.

13. The method of claim 1, wherein the repeated transmission is triggered when a transmission timing of an uplink channel for transmitting the HARQ-ACK information overlaps with a transmission timing of a different uplink channel and when a payload size of the HARQ-ACK information and a payload size or a coding rate of uplink control information to be transmitted on the different uplink channel are equal to or greater than a threshold.

14. The method of claim 1, wherein a pattern of the frequency hopping is determined according to the number of times of the repeated transmission.

15. The method of claim 1, wherein when the repeated transmission is triggered, a demodulation reference signal is transmitted in a TTI or a symbol indicated by a higher layer signal or a physical layer signal.

16. The method of claim 1, wherein when the repeated transmission is triggered, sharing of a demodulation reference signal in TTIs where the repeated transmission is performed is enabled by a higher layer signal or a physical layer signal.

17. The method of claim 1, wherein when the repeated transmission is triggered and when a transmission timing of an uplink channel for transmitting the HARQ-ACK information partially or completely overlaps with a transmitting timing of a different uplink channel, HARQ-ACK information to be transmitted in a TTI overlapping with the transmitting timing of the different uplink channel among TTIs where the repeated transmission is performed is dropped.

18. The method of claim 1, wherein when the repeated transmission is triggered and when a transmission timing of an uplink channel for transmitting the HARQ-ACK information partially or completely overlaps with a transmitting time of a different uplink channel, the uplink channel for transmitting the HARQ-ACK information and the different uplink channel are simultaneously transmitted.

19. A user equipment (UE) for supporting a plurality of transmission time intervals (TTIs), a plurality of subcarrier spacings, or a plurality of processing times in a wireless communication system, the UE comprising:
a receiver;
a transmitter; and
a processor configured to control the receiver and the transmitter,
wherein the processor is configured to receive a configuration of repeated transmission of acknowledgement/non-acknowledgement (HARQ-ACK) information for a downlink transport block and transmit the HARQ-ACK information to a base station according to the configuration of the repeated transmission when the repeated transmission is triggered,
wherein the repeated transmission is triggered when a predetermined condition is satisfied, and
wherein when the repeated transmission is triggered, uplink resources on which the HARQ-ACK information is to be transmitted in every specific number of TTIs are determined by frequency hopping.

* * * * *